Figure 1:
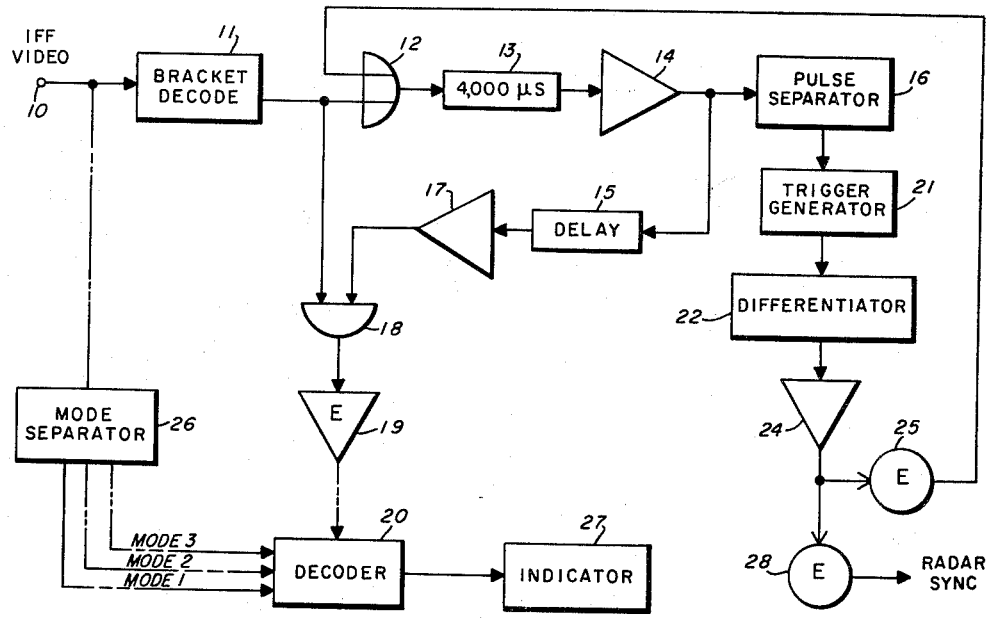

May 4, 1965   B. H. HUMPHERYS   3,182,310
IFF SYSTEM DEFRUITER
Filed March 20, 1962

INVENTOR.
BERNARR H. HUMPHERYS
BY
ATTORNEYS

United States Patent Office 3,182,310
Patented May 4, 1965

3,182,310
IFF SYSTEM DEFRUITER
Bernarr H. Humpherys, 719 Golden Rod,
Escondido, Calif.
Filed Mar. 20, 1962, Ser. No. 181,209
2 Claims. (Cl. 343—6.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a system for reducing the adverse effects of interference on IFF display visibility and more particularly, to a system for rejecting nonsynchronous replies in an IFF system and specifically, to an IFF system defruiter.

A fundamental requirement of an IFF system is the ability to obtain reliable information under conditions of heavy traffic. The fact that electronic recognition systems in general are especially vulnerable in this respect has been noted.

To illustrate the nature of the limitation imposed upon system traffic capacity, consider a situation wherein many interrogator responsors are challenging asynchronously a number of aircraft. Each IFF receiver will accept replies to associated interrogators as well as the replies to other interrogators operating in the vicinity. In that the latter replies, commonly called "fruit," are not synchronous, they constitute a form of interference generated by the system itself. Under such conditions even the simplest type display may become confused and the identity of targets ambiguous. In order to solve the problems presented, various systems have been proposed among which are systems utilizing mercury delay lines and cathode ray storage tubes.

In the system utilizing the mercury delay line, video from an IFF receiver, i.e., responsor, is used to amplitude modulate a C-W carrier of frequency $f_0$ in a master-oscillator power-amplifier circuit. The modulated carrier then is used to excite an X-cut quartz plate resonant at $f_0$ causing thickness vibrations which are transmitted into the supersonic medium, mercury. These vibrations are propagated through the mercury column with the velocity of sound in mercury, approximately 1500 meters/second. At the opposite end of the column, a quartz plate, identical to that used as the transmiter, is excited by the incident compressional wave. The piezoelectric voltage generated by the receiving crystal is subsequently amplified by a bandpass amplifier, whose center frequency is $f_0$, and detected. In such a system the entire reply train is sent down the line, i.e., the start and stop pulses plus video information. Therefore, the delay lines and subsequent circuitry has to be designed so the video information is not distorted or destroyed. This requires that the mercury delay line be very critical and leads to a prohibitive cost for such a system.

In addition, the delay of the mercury line must be equal to the reciprocal of the associated interrogator repetition rate. This equality must be maintained very accurately in order that replies to two successive interrogations may overlap sufficiently to produce an output. For a delay of 2000 microseconds, i.e., a 500 c.p.s. interrogation rate, and pulses of one microsecond duration, a tolerance of ±0.1 microsecond amounts to an accuracy of 50 parts in a million. This exacting requirement can best be satisfied by utilizing the delay line itself as the timing element for the pulse repetition rate. However, this leads to the shortcoming that the repetition rate of the IFF system is determined by the mercury delay line which leads to the further drawback that it is difficult and impractical to adapt the radar system to operate at the IFF rate.

An object of the present invention is to provide an IFF defruiter which is low-cost, easy to construct and uses conventional components.

An additional object of the invention is to provide an IFF defruiter which does not treat video information and thereby allows the use of simple low-cost conventional components.

A further object of the invention is to provide an IFF defruiting system which uses bracket decode for coincidizing without treating video information between the brackets.

An additional object of the invention is to provide an IFF defruiting system which is compatible with conventional IFF systems and is further easy and practical to adapt to radar systems.

An additional object of the invention is to provide an IFF defruiter which utilizes a low-cost conventional delay line.

A further object of the invention is to provide a defruiting system which does not require a defruiter for each Mode.

Another object of the invention is to provide a defruiting system which will provide all all-mode presentation.

Figure 2:
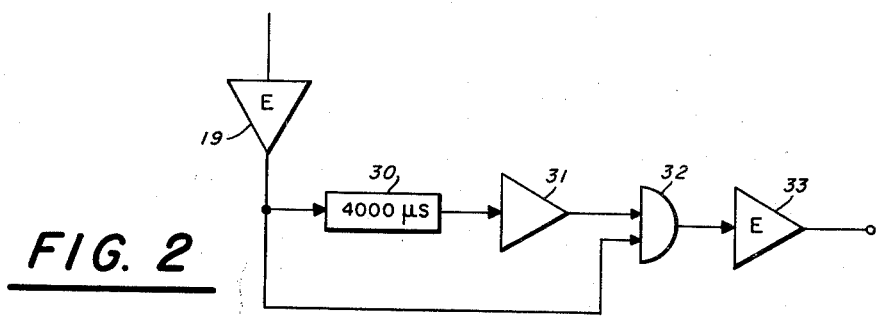

Other objects and many of the attendant advantages of this invention will be readily appreciated as the same becomes better understood by reference to the following detailed description when considered in connection with the accompanying drawings wherein:

FIG. 1 is a block diagram of one embodiment of the defruiter of the present invention; and FIG. 2 is a simplified block diagram of another embodiment of the present invention.

The system set forth for reducing the adverse effects of fruit on IFF display visibility is based on utilizing a bracket decode technique and a conventional delay line. All replies which do not change position in time with respect to the challenging pulses from one interrogation cycle to the next are accepted as legitimate replies. Conversely, replies which change their relative time position by a predetermined amount from interrogation cycle to cycle are rejected as being nonsynchronous.

To separate locked and unlocked replies in accordance with the preceding basis, all signals received in reply to one interrogation are delayed for at least one interrogation period and compared in an And gate with replies received during a second or later interrogation period. Output signals derived from the And gate represent locked replies and thereby reduce unlocked replies and fruit.

In the operation of the embodiment of the invention as set forth in FIG. 1, unseparated video from an IFF receiver is brought in at input 10 and coupled to a bracket decode 11. The bracket decode 11 is a delay line having taps thereon spaced apart a distance corresponding to start and stop pulses of a reply train. The bracket decode 11 decodes and coincidizes start and stop pulses to produce a single output pulse.

The output pulse from the bracket decode 11 is coupled through Or gate 12 to a 4000 microsecond magnetostriction delay line 13. The function of the delay line 13 is to delay the bracket decode pulse by an amount equal to the interval between succeeding start pulses of a received IFF video reply from a transponder. The choice of 4000 microseconds is an arbitary one in that in this instance the repetition rate of the radar system was 250 cycles per second. However, it is to be understood that magnetostriction delay line 13 may have various output taps thereon so that it may be used with radar systems having various and sundry repetition rates.

The output of the delay line 13 is then amplified in an amplifier 14 before being coupled to a delay line 15 and a pulse separator 16. Delay line 15 is used to compensate for circuit characteristics and may be adjustable to provide a fairly wide range of compensation. The output of the delay line 15 is coupled to an amplifier 17 for further amplification. The output of amplifier 17 then forms one input to And gate 18.

In addition, an output from bracket decode 11 is also coupled to And gate 18. Thus, when outputs from the amplifier 17 and bracket decode 11 are present at the input of the And gate 18 an output pulse will be coupled to amplifier emitter follower 19. The output of the amplifier emitter follower 19 comprises defruited bracket decode pulses which may be used as enabling pulses for decoders represented at 20 which would be used to decode the pulse trains coupled to input 10 when the output of And gate 18 indicates that a locked reply is present at bracket decode 11.

Thus, the IFF video coupled to input 10 is also coupled to a mode separator 26 which has outputs corresponding to Mode 1, Mode 2 and Mode 3 operation which outputs are coupled to the decoder 20. Therefore, by appropriate selection the operator of the system can display on an indicator 27 any particular mode desired in that the enabling pulse may be used to decode any mode received.

In addition, in order to synchronize the IFF system with the associated radar system it is necessary that some sort of synchronization be attained between the two. In order to provide this, the output of the amplifier 14 which comprises the bracket decode pulse and the snychronization pulse is coupled to the pulse separator 16 as previously stated. The bracket decode pulse is of a relatively low amplitude compared to the synchronization pulse and in order to prevent the bracket decode pulse from triggering trigger generator 21, a pulse separator 16 is provided. The pulse separator comprises an amplifier clipper so that the output of the pulse separator 16 comprises the synchronization pulse only. Single pulses are used to trigger a trigger generator 21, the output of which is coupled to a differentiator 22. The differentiator 22 is used to produce a sharp spike at the trailing edge of the pulses from the trigger generator 21. The trigger generator 21 may be a simple multivibrator, however, any free running trigger generator may be used.

The output of differentiator 22 is then coupled to an amplifier 24 for amplification and then to an emitter follower 25. The output of the emitter follower 25 is coupled to the input of Or gate 12 to provide a recycling so that the system is self-sustaining and provides a continuous clock pulse output.

In addition, another output from amplifier 24 is coupled through a second emitter follower 28 to provide clock pulses to the radar sync.

Should it be desired that a double comparison, i.e., a double defruiting be done, the system of FIG. 2 would be added to the embodiment of the invention as set forth in FIG. 1. In this instance the output of the amplifier-emitter-follower 19 of FIG. 1 is coupled to a delay line 30 which is again, in this instance, a 4000 microsecond magnetostriction delay line. Again, this delay line 30 might have multiple output taps for adaption to any radar system repetition rate. The output of the delay line 30 is coupled to an amplifier 31 for amplification and the output of the amplifier forms one input to And gate 32. Another input to And gate 32 comprises the output of the amplifier emitter follower 19. Thus, when outputs from the amplifier 31 and the amplifier emitter follower 19 are present at the inputs to And gate 32 an output pulse therefrom will be forthcoming. This output pulse is then coupled through an amplifier emitter follower 33 as an enabling pulse for a decoder such as decoder 20 of FIG. 1.

The embodiment of the invention as set forth in FIG. 2 is a further refinement of the embodiment set forth in FIG. 1. As can be seen, if practical and desirable, further delays such as that set forth in FIG. 2 might be added serially at the output of amplifier-emitter-follower 33.

The greatest advantage of the systems as set forth in FIGS. 1 and 2 over the prior systems using mercury delay lines or other electrically long delay lines capable of passing the wide band IFF video signals is that in the present system only the bracket pulses, i.e., start-stop pulses are examined and, therefore, the delay line and subsequent circuitry do not have to be designed to handle the video information contained in the entire reply train of pulses. In addition, by using an electromagnetostriction delay line, taps for different repetition rates are easily obtained and, thus, the defruiter may be used with various IFF systems and with various different radar systems.

In the present system the bracket pulses are examined only to determine whether a locked reply has been received or not, and whether the reply is synchronous. The output from the coincidizing circuit is used as an enabling pulse for the decoder or decoders wherein the entire pulse train is then treated. Prior defruiting systems operated only on mode separated video and required a defruiter for each mode. Thus, the system utilizing storage require two storage tubes for each mode.

In addition, in that bracket decode pulses are available at the output of emitter-follower 19 or 33, these may be displayed directly which would provide an all-mode presentation.

In the operation of the present system as set forth in FIG. 1 the raw video at input 10 is bracket decoded in bracket decode 11 and the decoded pulse delayed one interrogation cycle and compared in And gate 18 against the next interrogation cycle from bracket decode 11. If the second reply is locked, i.e., if the delayed pulse from magnetostriction line 13 coincides with the output of bracket decode 11, the output of And gate 18 provides an enabling pulse for the decoder 20 and the raw video coupled in at 10 is then decoded. The decoded reply which shows an indicator 27 as a defruited light pulse in the case of a CRT tube. That is to say, there would be no fruit or interference or a minimum of fruit or interference utilizing the embodiment of the invention as set forth in FIG. 1.

If the embodiment of the invention as set forth in FIG. 2 were added on to that of FIG. 1 the bracket decode pulse from bracket decode 11 would be delayed twice, once in line 13 and once in line 30 before examined against a third interrogation reply in And gate 32 of FIG. 2. Thus, by utilizing the embodiment of FIG. 2, any unsynchronized reply which somehow slips through the system of FIG. 1 would be rejected in the embodiment of FIG. 2.

Through the use of the present invention, a manufactured defruiter might be constructed for an amount approximately 1/10 that of the prior defruiter systems and, in addition, one would have a defruiter which could be used with any radar system.

Obviously many modifications and variations of the present invention are possible in the light of the above teachings. It is therefore to be understood that within the scope of the appended claims the invention may be practiced otherwise than as specifically described.

What is claimed is:

1. An IFF defruiter comprising;
   bracket decode means for decoding start and stop pulses on an interrogation reply and having inputs and outputs,
   one of said inputs being adapted to receive IFF video,
   delay means operatively connected to an output of said bracket decode means for delaying the pulse output of said bracket decode means by at least one repetition rate of an associated radar system,
   coincidizing means having inputs and an output,
   one input to said coincidizing means being operatively connected to the output of said delay means,
   another input to said coincidizing means operatively connected to an output of said bracket decode means,
said coincidizing means being operable to produce an output pulse when outputs from said delay means and said bracket decode means are present at the input,
said output pulse from said coincidizing means providing an enabling pulse for a decoding operation on received IFF video,
clock pulse producing means for producing synchronizing pulses operatively connected to the output of said delay means,
said clock pulse producing means having outputs,
one of said outputs being operatively connected to the input of said delay means,
another of said outputs being adapted for connection to a radar synchronization system so that the IFF defruiter is synchronized with associated radar circuitry.

2. An IFF defruiter as set forth in claim 1 and further including; other delay means having inputs and outputs, one of said inputs operatively connected to the output of said coincidizing means; other coincidizing means having inputs and outputs, one input of said other coincidizing means being operatively connected to an output of said other delay means, another input of said other coincidizing means being operatively connected to the output of said coincidizing means, said other coincidizing means being operable to produce an output enabling pulse when inputs are present from said other delay means and said coincidizing means.

References Cited by the Examiner
UNITED STATES PATENTS
3,055,001  9/62  Ricketts _____ 343—6.5

CHESTER L. JUSTUS, *Primary Examiner.*